July 30, 1968   C. C. PERRY   3,394,592
BIMETAL DEVICE FOR RECORDING TEMPERATURE EXTREMES
Filed March 30, 1966   2 Sheets-Sheet 1

INVENTOR
CHARLES C. PERRY

BY Olson and Stephenson
ATTORNEYS

July 30, 1968     C. C. PERRY     3,394,592
BIMETAL DEVICE FOR RECORDING TEMPERATURE EXTREMES
Filed March 30, 1966     2 Sheets-Sheet 2
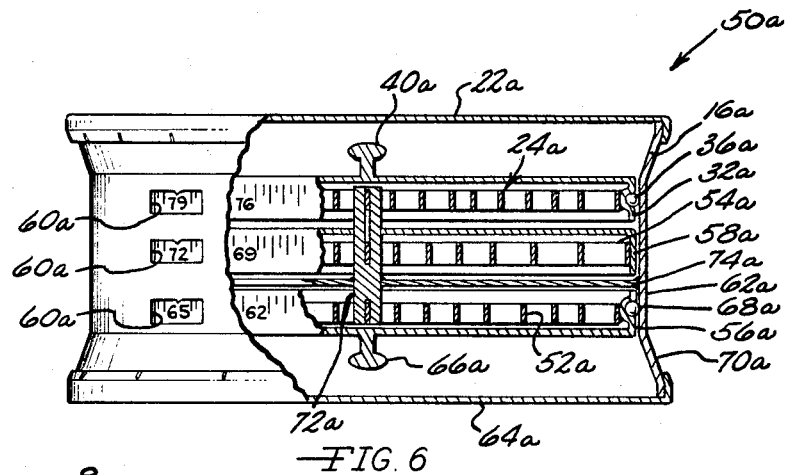
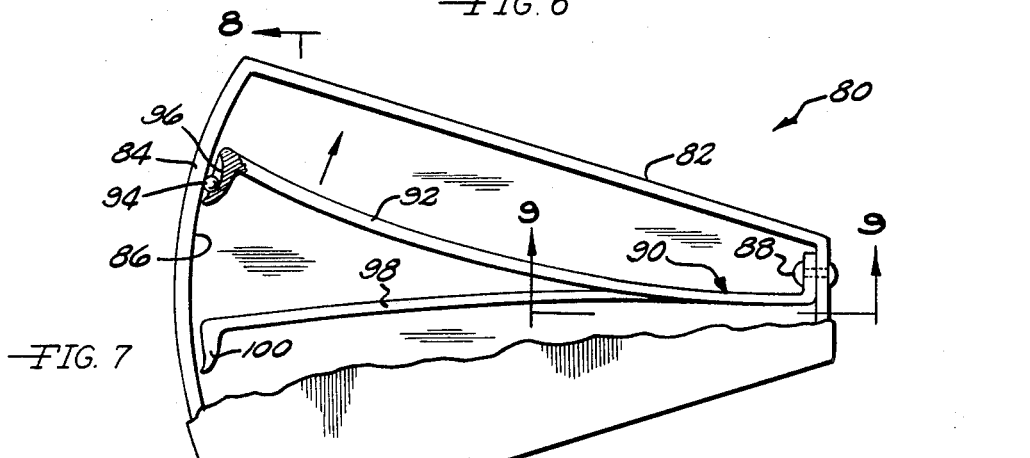
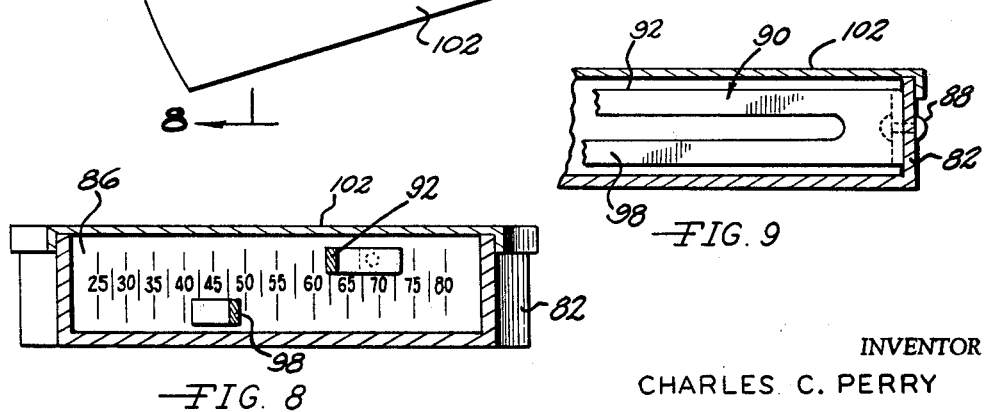
INVENTOR
CHARLES C. PERRY
BY Olsen and Stephenson
ATTORNEYS

United States Patent Office 3,394,592
Patented July 30, 1968

3,394,592
BIMETAL DEVICE FOR RECORDING TEMPERATURE EXTREMES
Charles C. Perry, Ann Arbor, Mich., assignor to W. M. Chace Company, Detroit, Mich., a corporation of Delaware
Filed Mar. 30, 1966, Ser. No. 538,834
10 Claims. (Cl. 73—363.7)

ABSTRACT OF THE DISCLOSURE

An indicator for recording an extreme condition of an ambient physical variable, such as temperature or humidity in which an elongated condition responsive element is mounted for movement in one direction only with respect to a condition indicating surface. The element is coupled to the condition indicating surface so that it cannot move in an opposite direction until the element is manually uncoupled from the condition indicating surface and reset.

---

The present invention relates to apparatus for recording extreme conditions of ambient physical variables, and particularly to apparatus for recording maximum and/or minimum temperature and humidity conditions.

There are many instances when it is important to be able to ascertain within a reasonable degree of accuracy the extremes in temperature and humidity conditions to which an item has been subjected. Thus, the home owner may have food stored in a freezer, and following a vacation or other occurrence which has resulted in his prolonged absence from his home, he may wish to know the effect that power failures or the like, which may have occurred during his absence, have had on the contents of the freezer. Since restoration of the power will have served to refreeze the contents, if they were thawed, he may not be able to detect or even be aware that the food was thawed during his absence.

Likewise, it is frequently necessary to be able to ascertain the temperature extremes to which goods have been subjected which have been shipped, particularly when transported through areas of extreme weather conditions, such as the tropics. Under such circumstances, it is also frequently desirable to determine, with a reasonable degree of accuracy, the range of humidity conditions to which the goods have been exposed.

Various devices are known for recording data relative to extremes of ambient physical variables, such as temperature and humidity, but such devices have limitations in the uses that can be made of them. Thus, prior art devices may be unsatisfactory for general usage because they are too complex in construction or too costly for the intended purpose, or if simply and cheaply manufactured, they may lack sufficient accuracy to be suitable for general usage. In most instances, such prior art devices have movable elements which are separate from the element that is responsive to the physical variable and such movable elements must be displaced and then held in their displaced positions in order to provide the desired information.

It is an object of the present invention to provide an indicator for recording extreme conditions of an ambient physical variable which is characterized by its relatively low cost and simple construction while providing a relatively accurate result.

It is another object of the present invention to provide an indicator of the foregoing character which is constructed and arranged so that the temperature or humidity responsive element is maintained in its extreme position until manually released, thus eliminating the need for movable pointers or indicators which must be separately moved and returned in place.

It is another object of the present invention to provide an indicator of the foregoing character which can readily be reset to a normal position so that the indicator can repeatedly be used.

In accordance with the present invention, an indicator is provided for recording an extreme condition of an ambient physical variable comprising a housing having a condition-indicating surface, an elongated element having one end mounted in said housing and responsive to changes in said ambient physical variable for flexure so as to move the other end thereof, said other end being coupled to said condition-indicating surface for unidirectional travel thereon so that said other end will be retained on said condition-indicating surface at a location representative of the most extreme condition of variation in one direction of the ambient physical variable to which the elongated element was subjected. It is contemplated that the elongated element may be a temperature resonsive bimetal element for use when the ambient physical variable represents temperature. It is also contemplated that the elongated element will be a laminated structure for sensing humidity changes, of the general type disclosed in copending application Ser. No. 404,221, filed Nov. 21, 1964.

Other objects of this invention will appear in the following description and appended claims, reference being made to the accompanying drawings forming a part of this specification wherein like reference characters designate corresponding parts in the several views.

In the drawings:

FIGURE 6 is a side elevation of an indicator embodying another form of the present invention;

FIGURE 7 is a top plan view of another indicator, illustrating still another embodiment of the present invention;

FIGURE 8 is a section taken on the line 8—8 of FIG. 7; and

FIGURE 9 is a fragmentary section taken on the line 9—9 of FIG. 7.

Figure 1:
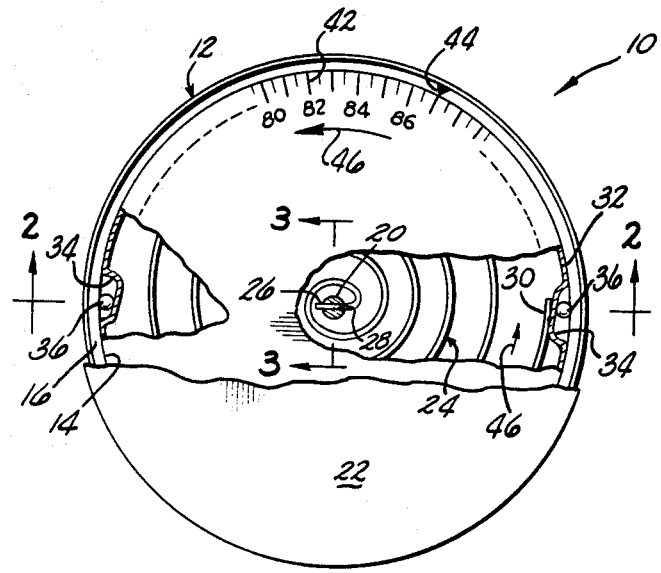
FIGURE 1 is a top plan view with portions broken away illustrating an indicator embodying the present invention.
Figures 2, 3:
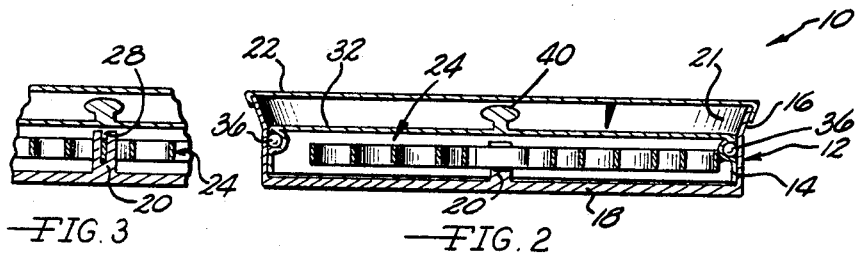
FIGURE 2 is a vertical section taken on the line 2—2 of FIG. 1.
FIGURE 3 is a fragmentary section taken on the line 3—3 of FIG. 1.
Figure 4:
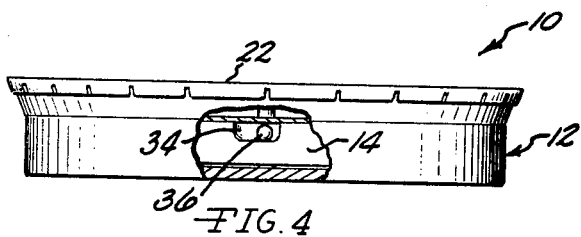
FIGURE 4 is a side elevation with a portion broken away to illustrate means for effecting unidirectional travel of the elongated element on a condition-indicating surface.
Figure 5:
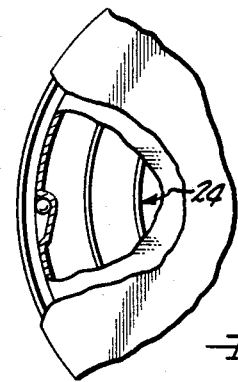
FIGURE 5 is a fragmentary top plan view with portions broken away showing the unidirectional travel means in a different stage of operation from that shown in FIG. 1.

Before explaining the present invention in detail, it is to be understood that the invention is capable of other embodiments and of being practiced or carried out in various ways. It is also to be understood that the phraseology or terminology employed herein is for the purpose of description and not of limitation.

Referring now to the drawings, the embodiment of the invention illustrated in FIGS. 1–5 will now be described. As there shown, an indicator 10 is provided for recording an extreme condition of an ambient physical variable, such as temperature or humidity. The indicator 10 has a housing 12 which includes a circular side wall 14 which has an upper flared portion 16 for a purpose to be described. Integrally formed with the circular side wall 14 is a bottom wall 18 which has a post 20 centrally located thereon. For a purpose to be explained hereinafter, the inner surface of the side wall 14 will be considered to be a condition-indicating surface 21. A suitable cover 22, preferably of a snap-on type, is secured on the upper edge of the outwardly flared portion 16 so as to close the upper end of the side wall 14.

An elongated element 24, of spiral configuration, is positioned within the housing 12 and has its inner end 26 mounted on the post 20 so that it will remain in a fixed position. In the illustrated embodiment, this is accomplished by having the end 26 positioned within a slot 28 formed in the post 20. The elongated element 24 has its outer end positioned adjacent to the condition-indicating surface 21 of the housing 12. The outer end 30 of the elongated element 24 is coupled to the condition-indicating surface 21 for unidirection travel thereon so that end 30 can travel in one direction around the circumference of the surface 21, but it will be restrained from moving back in the other direction. Thus, it will be held in the position of greatest advancement in the one direction on the surface 21.

Any suitable means may be employed for coupling the end 30 to the surface 21 in this manner. In the illustrated embodiment, the end 30 is fixed to the side wall 38 of an inverted cup-shape member 32. The side wall 38 has a plurality of camlike depressions 34 formed in its outer periphery in which are positioned a plurality of balls or rollers 36. The contour of the depressions 34 are such that in conjunction with the adjacent wall 14, the ball action permits rotation of the member 32, and thereby the one end 30 of spiral element 24, in one direction of travel, but not in the other.

The top surface of member 32 is provided with indicia 42 so that it can function as an indicator. There will be occasions when it will be desired to release the unidirectional locking action between the end 30 of spiral element 24 and the condition-indicating surface 21 of wall 14, and this can be accomplished merely by manually grasping knob 40 on member 32 and lifting member 32 a limited distance upwardly away from the bottom wall 18 so that the balls 36 are moved up to the flared wall portion 16, thereby releasing them from their clutching or locking action with respect to the portion of wall 14 of smaller diameter. The knob 40 can then be depressed, and the spring in element 24 will pull the member 32 and the balls 36 back into their normal positions within the smaller portion of circular wall 14.

Referring to FIG. 1, it will be observed that the indicia 42 at the outer periphery of member 32 can be read in conjunction with a pointer 44 which is located on the condition-indicating surface 21. The indicia 42 may relate to temperature conditions, humidity conditions, or those of any other ambient physical variable which is to be recorded by the indicator 10.

The form of the invention disclosed in FIGS. 1–5 is an extreme reading thermometer which will accurately indicate the highest (or lowest) temperature existing in its environment following insertion of the thermometer or indicator 10 into the environment. In this form of the invention, the elongated element 24 is a temperature responsive bimetal element of a conventional type which is adapted to flex in response to temperature changes. In this form of the invention, the elongated element 24 is arranged to have a spiral configuration so as to give it maximum length, thereby to increase the sensitivity of the instrument.

In operation of the embodiment of the invention illustrated in FIGS. 1–5, if the temperature rises, the elongated element 24 will flex in response to the temperature change, causing the one end 30 to travel in a counterclockwise direction as indicated by the indicator arrow 46 in FIG. 1, and this will have the effect of deflecting the ball or roller 36 into the deeper part of the depression 34 so that the member 32 will be free to rotate in the counterclockwise direction. When the temperature decreases, the ball 36 interacts with the shallow end of the depression 34 and the adjacent wall 14 to prevent reverse rotation of the member 32 and thereby the end 30. Therefore, at any temperature less than the maximum, the elongated element 24 is firmly held in the position corresponding to the greatest temperature to which the indicator has been exposed.

It will be observed that the indicator 10 is a relatively small compact structure which functions irrespective of the position in which it is placed. Thus, the indicator 10 can be placed among wrappings of an article which is to be shipped and the maximum temperature that is recorded during shipment will have no bearing on the position in which the indicator 10 is placed during shipment. It will also be observed that the indicator 10 can be reused or reset merely by removing the replaceable cover 22, lifting the knob 40 so as to elevate the member 32 and the balls 36 sufficiently so that the balls ride out on the flared wall portion 16, thereby permitting them to release the holding action that they have on the element 24. When the knob 40 is lifted, the spiral element 24 will remain fixed at its inner end 26 to the post 20, so that it will tend to assume a cone shape. The member 32 can then be rotated in a direction counter to arrow 46 and returned to its FIG. 2 position. The element 24 will then return to its normal position corresponding to the temperature of the environment in which it is located. Thereafter, the cover 22 can be replaced and the indicator 10 is ready for further use.

While the embodiment of FIGS. 1–5 has been described in connection with a temperature responsive bimetal element, it is to be understood that the elongated element 24 may be a laminated structure of the type disclosed in copending application Ser. No. 404,221, wherein one layer of the laminated structure may be a layer of a non-hygroscopic material which can be plastic, metal, or any other suitable non-hygroscopic substance, and the other layer will be an elastic hygroscopic material which changes dimensions in response to changes in humidity conditions. Thus, changes in humidity will produce flexure of such an element. For a more detailed description of this form of the elongated element, reference is made to the copending application. It will be understood that the indicator 10, if constructed with a humidity sensing element of this character will function the same with respect to humidity conditions as the element 24 does with respect to temperature conditions.

Referring now to FIG. 6, a modified form of the invention will be described. As there shown, the indicator 50a is similar to the indicator 10 in that it has an upper elongated element 24a of spiral configuration which is arranged to function essentially the same as the element 24 of the embodiment of FIG. 1. In addition, the indicator 50a has a second elongated element 52a which is adapted to function in such a manner that it will record the temperature extreme in the other direction from that measured and recorded in connection with the element 24a. The indicator 50a has a third elongated element 54a which is arranged to indicate continuously the temperature of the environment in which the indicator 50a is located. In this embodiment, the outer peripheries of the cup-shape members 32a, 56a and 58a have indicia thereon which can be read through openings 60a in the side wall of the housing 62a. As shown, the existing temperature of the environment in which the indicator 50a is positioned is 72°. The upper temperature reading indicates that the maximum temperature in the environment in which the indicator 50a has been positioned is 79° and the lower reading indicates that the lowest temperature of the environment in which the indicator 50a has been located is 65°.

When it is desired to reset the indicator 50a, the cover 22a must initially be removed and the knob 40a can then be raised a limited amount so as to raise the balls 36a into the region of the flared portion 16a, thereby to release the clutching action of the balls between the side wall of the housing 62a and of the ring 32a. Thereafter, the knob 40a can be rotated to lower the indicated temperature at opening 68 to a temperature below ambient. Knob 40a is then depressed so that the spring in the element 24a will pull the member 32a and its associated parts back to the FIG. 1 position in which element 24a can flex in one direction. Similarly, the elongated element 52a can be restored to its normal position for a temperature of 72° by removing the lower cover 64a, and thereafter, moving the knob 66a in a direction so as to move the balls 68a to the region of the flared portion 70a, thereby breaking the clutching action of the balls 68a. The three elongated elements 24a, 52a and 54a are retained in the positions shown in FIG. 6 by means of a center post 72a which is supported on a fixed plate 74a secured to the side wall of the housing 62a.

Referring now to FIGS. 7, 8 and 9 another embodiment of the invention will be described. As here shown, an indicator 80 has a housing 82 which has an accurate segment defining the side wall 84. The inner surface of the wall 84 has indicia thereon to provide a condition-indicating surface, and located radially inwardly of this surface 86 is a rivet or support member 88 which supports an elongated element 90. In this embodiment of the invention the elongated element 90 is in the form of a flat blade. Over the major portion of its length, the flat blade is cut to separate it into two sections, namely, a first elongated element 92 and a second similar element 98. The first element 92 has its free or unsupported end coupled to the condition-indicating surface 86 for unidirectional travel thereon by means of the ball or roller 94 which is carried in the camlike depression 96. Thus, the elongated element 92 functions similar to the elongated elements in the embodiments previously described wherein this element can travel in one direction in response to temperature changes, but it cannot travel in the other direction. Thus, the element 92 will indicate the maximum or minimum temperature or humidity to which it has been exposed. The second elongated element 98 is mounted so that its free end 100 is free to travel in either direction relative to the condition-indicating surface 86, and therefore, it will serve to indicate continuously the existing ambient temperature or humidity of the environment in which the indicator 80 is located. When it is desired to reset the elongated element 92 to a normal position corresponding to that of the surrounding environment, it is merely necessary to remove the cover 102, and thereafter manually flex the element 92 so that it can spring back to the normal position maintained by element 98.

In this embodiment of the invention, either a thermostatic bimetal element can be employed for the elongated element 90, or a humidity responsive element of the type described in copending application, Ser. No. 404,221, may be used.

Having thus described my invention, I claim:

1. An indicator for recording an extreme condition of an ambient physical variable comprising a housing having a condition-indicating surface, an elongated element having one end mounted in said housing and responsive to changes in said ambient physical variable for flexure so as to move the other end thereof, said other end being coupled to said condition-indicating surface for travel in only one direction thereon, and coacting means on said surface and said other end of said element preventing said element from moving in a direction opposite to said one direction so that said other end will be retained on said condition-indicating surface at a location representative of the most extreme condition of variation in one direction of the ambient physical variable to which the elongated element was subjected.

2. An indicator according to claim 1, wherein said elongated element is a temperature responsive bimetal element.

3. An indicator according to claim 1, wherein said elongated element is a humidity responsive laminated element.

4. An indicator according to claim 1, wherein said other end is manually releasable from said condition-indicating surface for resetting the element to its normally unflexed position.

5. An indicator according to claim 1, wherein said condition-indicating surface has a generally arcuate shape, said housing has a post radially inward of said surface, and said elongated element has a spiral configuration the inner end of which is mounted on said post.

6. An indicator according to claim 1, wherein said condition-indicating surface has a generally arcuate shape, said housing has a support member radially inward of said surface, and said elongated element is a flat blade, one end of which is mounted on said support member.

7. An indicator according to claim 1, wherein said housing has a second elongated element having one end mounted in said housing and responsive to changes in said ambient physical variable for flexure so as to move the other end thereof, the other end of said second elongated element being freely movable adjacent to said condition-indicating surface for continuously indicating the existing condition of the ambient physical variable.

8. An indicator according to claim 1, wherein said housing has a second elongated element having one end mounted in said housing and responsive to changes in said ambient physical variable for flexure so as to move said other end thereof, the other end of said second elongated element being coupled to said condition-indicating surface for unidirectional travel thereon in the opposite direction from that of the other end of the first-named elongated element so that the other end of said second elongated element will be retained on said condition-indicating surface at a location representative of the most extreme condition of variation in the other direction of the ambient physical variable to which the elongated elements were subjected.

9. An indicator according to claim 1, wherein said housing has a removable cover to permit access to the elongated element for resetting the same to its normally unflexed position.

10. An indicator according to claim 5, wherein said housing has a circular wall of which said condition-indicating surface is a part, said circular wall having an outwardly flared section, said elongated element being axially displaceable relative to the confines of said flared section for releasing said element from its retained position on said condition-indicating surface.

References Cited

UNITED STATES PATENTS

| | | | |
|---|---|---|---|
| 1,478,258 | 12/1923 | Schuach | 73—363.7 |
| 2,651,935 | 9/1953 | Albe | 73—1 |
| 3,053,090 | 9/1962 | Ingersoll et al. | 73—336 |

S. CLEMENT SWISHER, *Primary Examiner.*

WILLIAM A. HENRY II, *Assistant Examiner.*